United States Patent
Hayashi et al.

(10) Patent No.: US 9,026,291 B2
(45) Date of Patent: May 5, 2015

(54) VEHICLE HYBRID DRIVE DEVICE

(75) Inventors: Koji Hayashi, Aichi-gun (JP); Takeshi Kanayama, Toyota (JP); Tetsuo Hori, Toyota (JP); Ryoki Ii, Toyota (JP); Tomoaki Furukawa, Toyota (JP); Akiko Nishimine, Toyota (JP); Takeshi Miyagawa, Toyokawa (JP); Tomoyuki Maruyama, Tajimi (JP); Norihiro Yamamura, Miyoshi (JP); Akihiro Sato, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/882,819

(22) PCT Filed: Nov. 4, 2010

(86) PCT No.: PCT/JP2010/069584
§ 371 (c)(1),
(2), (4) Date: May 3, 2013

(87) PCT Pub. No.: WO2012/059997
PCT Pub. Date: May 10, 2012

(65) Prior Publication Data
US 2013/0226387 A1    Aug. 29, 2013

(51) Int. Cl.
*B60W 20/00*    (2006.01)
*B60K 6/442*    (2007.10)
*B60K 6/445*    (2007.10)
(Continued)

(52) U.S. Cl.
CPC ............. *B60W 20/20* (2013.01); *Y02T 10/6234* (2013.01); *B60K 6/442* (2013.01);
(Continued)

(58) Field of Classification Search
CPC .... Y02T 10/6234; B60K 6/442; B60K 6/445; B60W 20/00; B60W 20/20; B60W 10/08

USPC .......................................................... 701/22
See application file for complete search history.

(56) References Cited

U.S. PATENT DOCUMENTS

| 2004/0134698 A1 | 7/2004 | Yamamoto et al. |
| 2004/0251064 A1 | 12/2004 | Imai |
| 2007/0254776 A1 | 11/2007 | Wakashiro et al. |
| 2012/0108386 A1 | 5/2012 | Wakashiro et al. |

FOREIGN PATENT DOCUMENTS

| JP | A-2000-350310 | 12/2000 |
| JP | A-2004-208477 | 7/2004 |

(Continued)

OTHER PUBLICATIONS

Machine Translation of JP 2005-001563 (filed by applicant); published Jan. 6, 2005.*

*Primary Examiner* — Mary Cheung
*Assistant Examiner* — Anne Mazzara
(74) *Attorney, Agent, or Firm* — Oliff PLC (57) ABSTRACT

A vehicle hybrid drive device having an EV running mode enabling a vehicle to run only with a second rotating machine used as a drive power source while an engine is disconnected from a drive power transmission path, a series HEV running mode enabling the vehicle to run only with the second rotating machine used as the drive power source while a first rotating machine is rotationally driven to generate electricity by the engine disconnected from the drive power transmission path, and a parallel HEV running mode enabling the vehicle to run with the engine and at least one of the first and second rotating machines used as the drive power sources while the engine is connected to the drive power transmission path. If a driver desires power-performance-oriented running or fuel-efficiency-oriented running, the range for selecting the series HEV running mode is made narrower or wider, respectively, than usual.

3 Claims, 6 Drawing Sheets

(51) Int. Cl.
  *B60W 50/08* (2012.01)
  *B60W 40/09* (2012.01)
(52) U.S. Cl.
  CPC ............... *B60K 6/445* (2013.01); *B60W 20/00* (2013.01); *B60W 2520/10* (2013.01); *Y10S 903/903* (2013.01); *Y02T 10/6239* (2013.01); *B60W 50/082* (2013.01); *B60W 40/09* (2013.01); *B60W 2540/10* (2013.01)

(56) References Cited

FOREIGN PATENT DOCUMENTS

| | | |
|---|---|---|
| JP | A-2005-1563 | 1/2005 |
| JP | A-2007-296975 | 11/2007 |
| JP | A-2009-274566 | 11/2009 |
| JP | A-2010-158927 | 7/2010 |

\* cited by examiner

|  |  | ENGINE 12 | MG1 | MG2 | STARTING CLUTCH 26 |
|---|---|---|---|---|---|
| EV |  | STOPPED | FREE | POWER RUNNING | INTERRUPTED |
| SERIES HEV |  | OPERATED | GENERATING | POWER RUNNING | INTERRUPTED |
| PARALLEL HEV | 1 | OPERATED | POWER RUNNING | FREE | ENABLED |
|  | 2 | OPERATED | GENERATING | POWER RUNNING | ENABLED |
|  | 3 | OPERATED | FREE | FREE | ENABLED |
| DECELERATION RUNNING |  | STOPPED | FREE | GENERATING | INTERRUPTED |

FIG.7(a)
CONFIGURATION

FIG.7(b)
RUNNING MODES

| | | ENGINE 12 | MG1 | MG2 | FIRST CLUTCH 152 | SECOND CLUTCH 154 |
|---|---|---|---|---|---|---|
| EV | | STOPPED | FREE | POWER RUNNING | INTERRUPTED | INTERRUPTED |
| SERIES HEV | | OPERATED | GENERATING | POWER RUNNING | ENABLED | INTERRUPTED |
| PARALLEL HEV | 1 | OPERATED | POWER RUNNING | FREE | ENABLED | ENABLED |
| | 2 | OPERATED | GENERATING | POWER RUNNING | ENABLED | ENABLED |
| | 3 | OPERATED | FREE | FREE | ENABLED | ENABLED |
| DECELERATION RUNNING | | STOPPED | FREE | GENERATING | INTERRUPTED | INTERRUPTED |

FIG.8(a)
CONFIGURATION

FIG.8(b)
RUNNING MODES

|  |  | ENGINE 12 | MG1 | MG2 | FIRST CLUTCH 166 | SECOND CLUTCH 168 | BRAKE 170 |
|---|---|---|---|---|---|---|---|
| EV |  | STOPPED | FREE | POWER RUNNING | INTERRUPTED | INTERRUPTED | ENGAGED |
| SERIES HEV |  | OPERATED | GENERATING | POWER RUNNING | ENABLED | INTERRUPTED | ENGAGED |
| PARALLEL HEV | 1 | OPERATED | FREE | POWER RUNNING | ENABLED | ENABLED | RELEASED |
|  | 2 | OPERATED | GENERATING | POWER RUNNING | ENABLED | ENABLED | RELEASED |
| DECELERATION RUNNING |  | STOPPED | FREE | GENERATING | INTERRUPTED | INTERRUPTED | ENGAGED |

VEHICLE HYBRID DRIVE DEVICE

TECHNICAL FIELD

The present invention relates to a vehicle hybrid drive device and particularly to improvement of a vehicle hybrid drive device having an EV running mode, a series HEV running mode, and a parallel HEV running mode.

BACKGROUND ART

A vehicle hybrid drive device is known that has an EV (electric vehicle) running mode enabling a vehicle to run only with a second rotating machine used as a drive power source while an engine is disconnected from a drive power transmission path, a series HEV (hybrid electric vehicle) running mode enabling the vehicle to run only with the second rotating machine used as the drive power source while a first rotating machine is rotationally driven to generate electricity by the engine disconnected from the drive power transmission path, and a parallel HEV running mode enabling the vehicle to run with the engine and at least one of the first and second rotating machines used as the drive power sources while the engine is connected to the drive power transmission path, which are selected in accordance with a mode switching condition defined based on at least one of required drive power and vehicle speed (see Patent Document 1).

PRIOR ART DOCUMENT

Patent Document

Patent Document 1: Japanese Laid-Open Patent Publication No. 2009-274566

SUMMARY OF THE INVENTION

Problem to be Solved by the Invention

However, in a conventional vehicle hybrid drive device, since the mode switching condition is not changed even if a driver selects a power mode etc., oriented to power performance, for example and a shift is made through the series HEV running mode to the parallel HEV running mode even when an accelerator is significantly operated during the EV running, it takes time until larger drive power is acquired in the parallel HEV running mode and sufficiently satisfying drivability performance cannot necessarily be acquired. Particularly, even if the series HEY running mode is set and the engine is started, the drive power of the engine is not acquired until the parallel HEV running mode is achieved, and a driver may have a feeling of strangeness. Even if a driver selects an eco-mode etc., oriented to fuel efficiency, when the parallel HEV running mode is set in accordance with a predefined mode switching condition, an operational point (rotation speed and torque) of the engine is limited by a vehicle speed etc., and, therefore, a fuel efficiency improvement effect may not be acquired as intended by the driver.

The present invention was conceived in view of the situations and it is therefore an object of the present invention to enable the EV running mode, the series REV running mode, and the parallel HEV running mode to be properly switched in accordance with an intention of a driver such as power-performance-oriented and fuel-efficiency-oriented.

Means for Solving the Problems

To achieve the object, the first aspect of the invention provides a vehicle hybrid drive device having an EV running mode enabling a vehicle to run only with a second rotating machine used as a drive power source while an engine is disconnected from a drive power transmission path, a series HEV running mode enabling the vehicle to run only with the second rotating machine used as the drive power source while a first rotating machine is rotationally driven to generate electricity by the engine disconnected from the drive power transmission path, and a parallel HEV running mode enabling the vehicle to run with the engine and at least one of the first and second rotating machines used as the drive power sources while the engine is connected to the drive power transmission path, the running modes being selected in accordance with a mode switching condition defined based on at least one of a required drive power and a vehicle speed, wherein a range for selecting the series HEV running mode in accordance with the mode switching condition is changed depending on a driver's intention.

The second aspect of the invention provides the vehicle hybrid drive device recited in the first aspect of the invention, wherein if a driver desires power-performance-oriented running, the range for selecting the series HEV running mode is made narrower than usual.

The third aspect of the invention provides the vehicle hybrid drive device recited in the second aspect of the invention, wherein (a) the mode switching condition is defined based at least on the required drive power and set such that the series HEV running mode and the parallel HEV running mode are selected after the EV running mode as the required drive power increases, and wherein (b) if a driver desires the power-performance-oriented running, an upper limit of a range of the required drive power for selecting the series HEV running mode is made lower than usual.

The fourth aspect of the invention provides the vehicle hybrid drive device recited in any one of the first to third aspects of the invention, wherein if a driver desires fuel-efficiency-oriented running, the range for selecting the series HEV running mode is made wider than usual.

The fifth aspect of the invention provides the vehicle hybrid drive device recited in the fourth aspect of the invention, wherein (a) the mode switching condition is defined based at least on the vehicle speed and set such that the series HEV running mode and the parallel HEV running mode are selected after the EV running mode as the vehicle speed increases, and wherein (b) if a driver desires the fuel-efficiency-oriented running, an upper limit of a range of the vehicle speed for selecting the series HEV running mode is made higher than usual.

The Effects of the Invention

In the vehicle hybrid drive device as described above, a range for selecting the series HEV running mode is changed in accordance with the mode switching condition depending on a driver's intention and, therefore, the drivability performance and the fuel efficiency performance intended by a driver can be acquired. For example, in the second aspect of the invention, if a driver desires the power-performance-oriented running, since the range for selecting the series HEV running mode is made narrower than usual, the EV running mode is promptly shifted to the parallel HEV running mode, which improves the drivability performance, and the drive power from the engine is promptly acquired after the start of the engine without causing a feeling of strangeness in the driver. Particularly, as described in the third aspect of the invention, when the upper limit of the range of the required drive power for selecting the series HEV running mode is made lower than usual, the shift to the parallel HEV running mode is made by a correspondingly smaller required drive power (accelerator operation amount etc), thereby enabling the acquisition of excellent drivability performance.

In the fourth aspect of the invention, if a driver desires the fuel-efficiency-oriented running, since the range for selecting the series HEV running mode is made wider than usual, the time and occasion of running in the series HEV running mode increase and the engine can be operated at the optimum operational point without being affected by the vehicle speed, which improves fuel efficiency. Particularly, as described in the fifth aspect of the invention, when the upper limit of the range of the vehicle speed for selecting the series HEV running mode is made higher than usual, the region of the parallel HEV running mode with poor fuel efficiency is accordingly narrowed and therefore, a more excellent fuel efficiency improvement effect can be acquired.

BRIEF DESCRIPTION OF THE DRAWINGS

FIG. 7 is a diagram for explaining yet another example of the vehicle hybrid drive device to which the present invention is preferably applied and (a) is a schematic of a configuration while (b) is a diagram of a plurality of running modes and operation states of each portions.

FIG. 8 is a diagram for explaining a further example of the vehicle hybrid drive device to which the present invention is preferably applied and (a) is a schematic of a configuration while (b) is a diagram of a plurality of running modes and operation states of each portions.

MODES FOR CARRYING OUT THE INVENTION

The engine is an internal combustion engine combusting fuel to generate power. Although a rotating machine is a rotating electric machine and is specifically an electric generator, an electric motor, or a motor generator selectively providing the functions, a second rotating machine used as a drive power source in the EV running mode and the series HEV running mode needs to have at least a function of an electric motor and is made up of an electric motor or a motor generator. A first rotating machine generating electricity in the series HEV running mode needs to have at least a function of an electric generator and is made up of a motor generator also having a function of an electric motor if the first rotating machine is used as a drive power source in the parallel HEV running mode.

Although the EV running mode and the series HEV running mode cause the engine to be disconnected from the drive power transmission path by a connection/disconnection device such as a clutch and an automatic transmission capable of enabling and interrupting power transmission, the parallel HEV running mode causes the engine to be connected to the drive power transmission path by the connection/disconnection device such that the engine can be used as a drive power source for running. In the parallel HEV running mode, the engine and at least one of the first and second rotating machines may always be used as the drive power sources for running or, for example, a rotating machine having excellent responsiveness may be used in an assisting manner. Therefore, the parallel HEV running mode may include the narrowly-defined parallel HEV running mode in which the engine and at least one of the first and second rotating machines are connected to the power transmission path so that the engine and at least one of the first and second rotating machines are used as the drive power sources for running as well as an engine running mode in which only the engine is used as the drive power source for running and a series parallel HEV running mode in which the engine and at least one of the first and second rotating machines are used as the drive power sources for running while the other of the first and second rotating machines is subjected to electric generation control to generate electricity. In other words, while the engine may always be used as a drive power source, at least one of the first and second rotating machines may be used as a drive power source at any time or in an assisting manner.

The mode switching condition is defined based on at least one of required drive power and vehicle speed and, for example, a two-dimensional mode switching map etc., using the required drive power and the vehicle speed as parameters are set, while the three running modes can be switched based only on one of the required drive power and the vehicle speed. In general, the EV running mode is selected at lower required drive power and lower vehicle speed and the series HEY running mode and the parallel HEV running mode are selected as the required drive power and the vehicle speed increase. The running modes can be switched in consideration of other additional conditions such as SOC (remaining battery) and temperature of a battery supplying electric power to the rotating machine. Although the required drive power can be replaced with an operation amount of an accelerator operated by a driver, the required drive power includes a drive power request other than the accelerator operation during auto cruise control etc.

Although the mode switching condition is changed depending on a driver's intention, if a driver operates a selecting operation member related to power performance and fuel efficiency performance such as the power mode and the eco-mode and also if a sequential mode or manual mode enabling gears to be changed by manual operation is selected when an automatic transmission is included, or if a lower speed range such as an L-range and a second range is selected, it may be determined that the power performance is considered important, and the mode switching condition can be changed. Whether importance is attached to the power performance or the fuel efficiency can be determined to change the mode switching condition, based on a change rate of an accelerator operation amount, an operation tendency of accelerator and brake pedals, and driver's preference for such as acceleration/deceleration of vehicle speed. A selection switch inhibiting the series REV running mode may be provided such that if the selection switch is operated, the series REV running mode is inhibited to make the switch directly between the EV running mode and the parallel REV running mode. The change in the range for selecting the series REV running mode may include a change eliminating the selection range of the series HEV running mode and if the power performance is considered important, the selection range of the series HEV running mode may be eliminated to assign the range to the parallel HEV running mode.

Although the mode switching condition can be changed in three stages, for example, a power-performance-oriented stage, a fuel-efficiency-oriented stage, and a normal stage therebetween, the mode switching condition may be changed in two stages or four or more stages, or may continuously be changed.

For a method of narrowing a range for selecting the series HEV running mode in the second aspect of the invention, for example, if the mode switching condition is defined by using the required drive power and the vehicle speed as parameters, the upper limits of the required drive power and the vehicle speed may be made lower than usual, or the lower limits thereof may be made higher, or both may be performed. The first aspect of the invention can be implemented in various forms and, for example, a range for selecting the series HEV running mode may be shifted entirely, i.e., in terms of both the upper and lower limits of the selection range, toward a lower required drive power or a lower vehicle speed.

In the third aspect of the invention, if the power performance is considered important, the upper limit of a range of the required drive power for selecting the series HEV running mode is made lower than usual so as to expand a range for selecting the parallel REV running mode; however, if the mode switching condition is defined by using the required drive power and the vehicle speed as parameters, the upper limit of the vehicle speed may also be made lower than usual.

For a method of expanding a range for selecting the series HEV running mode in the fourth aspect of the invention, for example, if the mode switching condition is defined by using the required drive power and the vehicle speed as parameters, the upper limits of the required drive power and the vehicle speed may be made higher than usual, or the lower limits thereof may be made lower, or both may be performed. The first aspect of the invention can be implemented in various forms and, for example, a range for selecting the series HEV running mode may be shifted entirely, i.e., in terms of both the upper and lower limits of the selection range, toward a higher required drive power or a higher vehicle speed.

In the fifth aspect of the invention, if the fuel economy is considered important, the upper limit of a range of the vehicle speed for selecting the series HEV running mode is made higher than usual so as to narrow a range for selecting the parallel HEV running mode; however, if the mode switching condition is defined by using the required drive power and the vehicle speed as parameters, the upper limit of the required drive power may also be made higher than usual.

First Embodiment

Embodiments of the present invention will now be described in detail with reference to the drawings.

Figure 1:
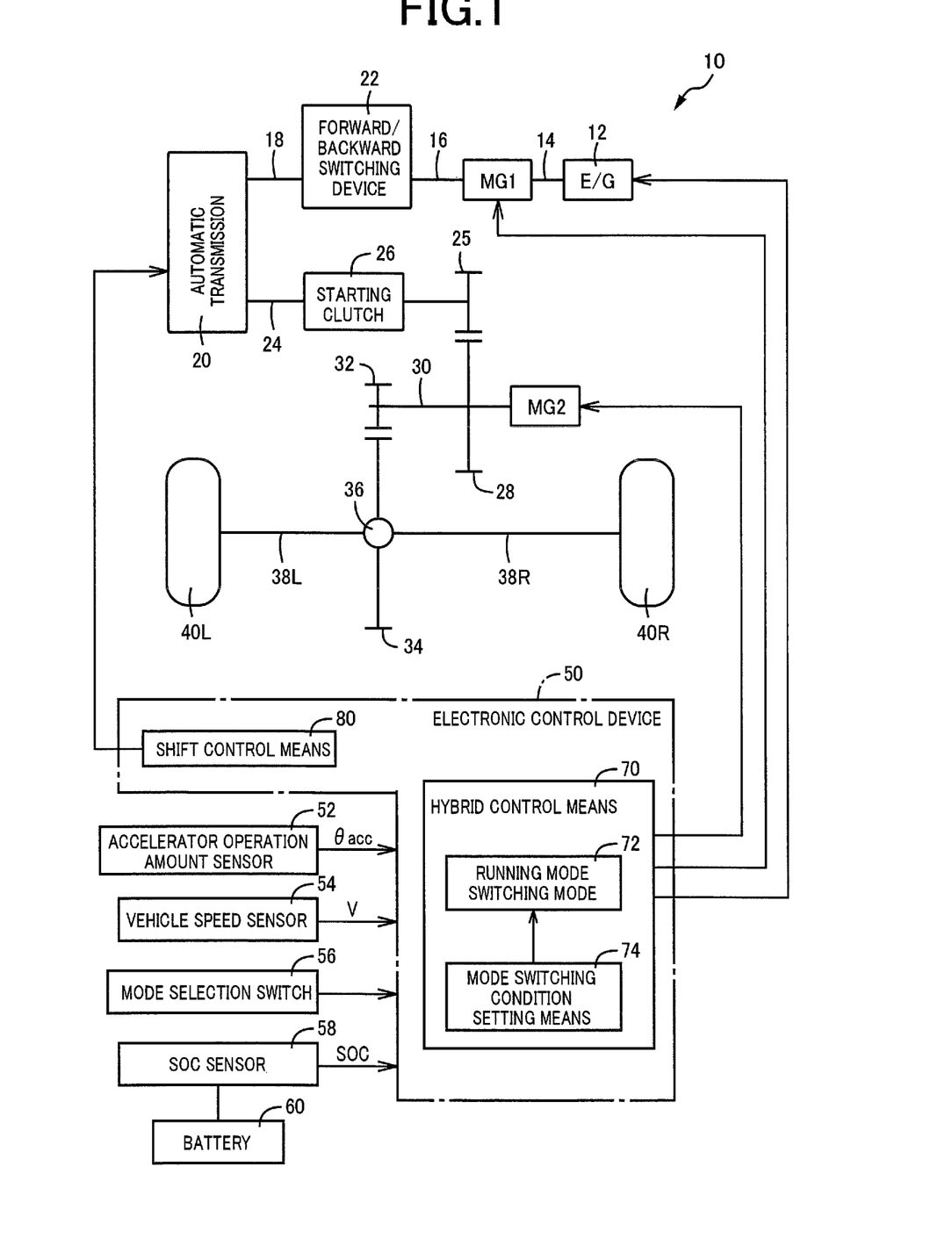
FIG. 1 is a schematic of a configuration of a vehicle hybrid drive device that is one embodiment of the present invention together with a control system switching running modes.

FIG. 1 is a schematic of a configuration of a vehicle hybrid drive device 10 that is one embodiment of the present invention and the vehicle hybrid drive device 10 includes an engine 12, a first motor generator MG1 coupled to a crankshaft 14 of the engine 12, a forward/backward switching device 22 coupled via an intermediate shaft 16 to the first motor generator MG1 and coupled via an input shaft 18 to an automatic transmission 20, a starting clutch 26 disposed between an output shaft 24 of the automatic transmission 20 and a first gear 25 to enable/interrupt the power transmission, a counter shaft 30 disposed with a second gear 28 engaging with the first gear 25, a second motor generator MG2 coupled to the counter shaft 30, a third gear 32 disposed on the counter shaft 30, a differential gear device 36 disposed with a fourth gear 34 engaging with the third gear 32, and left and right front drive wheels 40L and 40R coupled via left and right axles 38L and 38R to the differential gear device 36. The engine 12 is made up of an internal combustion engine combusting fuel to generate power and each of the first motor generator MG1 and the second motor generator MG2 can be used as an electric motor and an electric generator. In this embodiment, the first motor generator MG 1 corresponds to the first rotating machine and the second motor generator MG2 corresponds to the second rotating machine.

Figure 2:
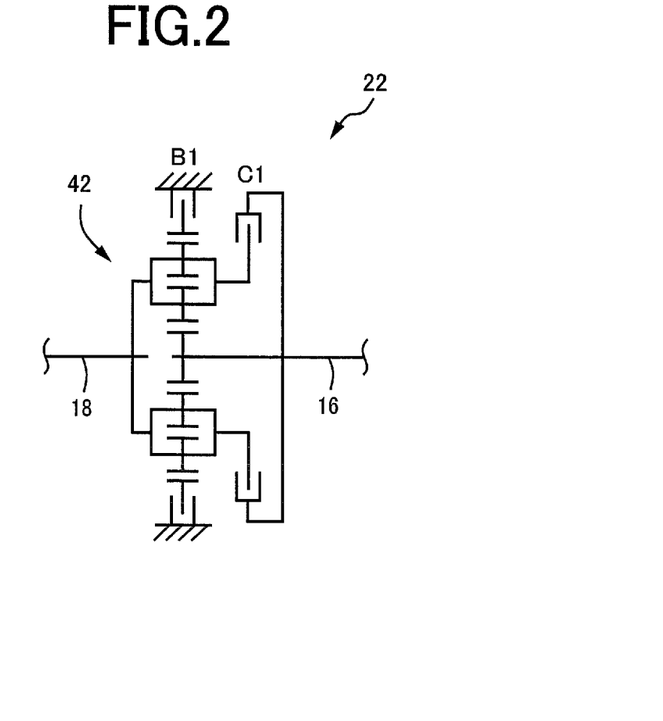
FIG. 2 is a schematic of an example of a forward/backward switching device of FIG. 1.

The forward/backward switching device 22 includes a double pinion type planetary gear device 42, a forward clutch C1, and a backward brake B1 as depicted in FIG. 2, for example. Specifically, a sun gear of the planetary gear device 42 is coupled to the intermediate shaft 16 and a carrier is coupled to the input shaft 18 and is selectively coupled via the forward clutch C1 to the intermediate shaft 16 while a ring gear is selectively non-rotatably fixed via the backward brake B1. When both the forward clutch C1 and the backward brake B1 are released, the power transmission between the intermediate shaft 16 and the input shaft 18 is interrupted; when the forward clutch C1 is connected and the backward brake B1 is released, a forward drive state is achieved to transmit the rotation of the intermediate shaft 16 directly to the input shaft 18; and when the forward clutch C1 is released and the backward brake B1 is fixed, a backward drive state is achieved to reverse and transmit the rotation of the intermediate shaft 16 to the input shaft 18. The forward clutch C1 and the backward brake B1 are made up of hydraulic friction engagement devices, for example. The forward/backward switching device 22 may have various forms such as those configured by using a single pinion type planetary gear device.

The automatic transmission 20 is made up of a belt type continuously variable transmission in this embodiment and includes an input-side pulley and an output-side pulley. The input-side pulley is disposed concentrically to the engine 12, the first motor generator MG1, and the forward/backward switching device 22 and the output-side pulley is disposed concentrically to the starting clutch 26 and the first gear 25. The starting clutch 26 is a hydraulic friction engagement device and corresponds to a connection/disconnection device enabling/interrupting the power transmission between the output shaft 24 and the first gear 25. The forward/backward switching device 22 capable of being neutral to interrupt the power transmission can be used as the connection/disconnection device.

The vehicle hybrid drive device 10 configured as above includes an electronic control device 50 providing the hybrid control of switching the drive force sources for running in a plurality of running modes and the shift control of the automatic transmission 20. The electronic control device 50 includes a microcomputer, executes signal processes in accordance with programs stored in advance in a ROM while utilizing a temporary storage function of a RAM, and is supplied with signals indicative of an accelerator operation amount θacc that is an operation amount of an accelerator pedal, a vehicle speed V, a selection mode, and an SOC (remaining battery) of a battery 60 that is a power source of the first motor generator MG1 and the second motor generator MG2 from an accelerator operation amount sensor 52, a vehicle speed sensor 54, a mode selection switch 56, and an SOC sensor 58, respectively. Although not depicted, the rotation speed of the engine 12 and the rotation speeds of the first motor generator MG1 and the second motor generator MG2 are detected by respective rotation speed sensors and various pieces of information necessary for various controls are supplied from sensors etc.

The mode selection switch 56 is a selection operation member disposed on an instrument panel, a steering wheel, etc., to allow a driver to select the power mode oriented to the running performance or the eco-mode oriented to the fuel efficiency, can alternatively select one of the power mode and the eco mode, and is set to a normal mode if no selection is made. The automatic transmission 20 is subjected to the shift control in accordance with predefined different shift conditions, for example, a power pattern in which a target input rotation speed for the vehicle speed V is maintained at relatively higher rotation (on the low gear side) or an eco-pattern in which a target input rotation speed for the vehicle speed V is maintained at relatively lower rotation (on the high gear side), depending on either the power mode or the eco-mode. The SOC is obtained by sequentially calculating a charge amount and a discharge amount of the battery 60, for example.

The electronic control device 50 basically functionally includes a hybrid control means 70 and a shift control means 80. The shift control means 80 provides the shift control of the automatic transmission 20 during the parallel HEV running in which the engine 12 is used as the drive power source, and adjusts a pulley width such that an input rotation speed is changed in accordance with a target input rotation speed map predefined by using, for example, the required drive power such as the accelerator operation amount θacc and the vehicle speed V as parameters, thereby controlling a gear ratio γ.

Figure 4:
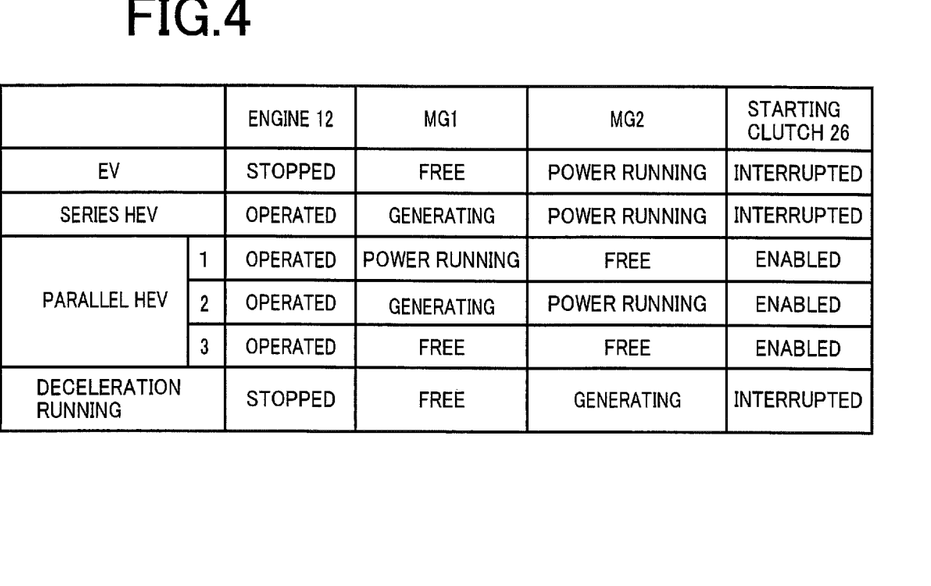
FIG. 4 is a diagram for explaining various running modes and operation states of each portions of the vehicle hybrid drive device of FIG. 1.

The hybrid control means 70 switches a plurality of types of running modes depicted in FIG. 4 for running and functionally includes a running mode switching means 72 and a mode switching condition setting means 74. In an EV running mode of FIG. 4, the starting clutch 26 is put into an interruption state to disconnect the engine 12 from the drive power transmission path and the second motor generator MG2 is subjected to power running control for forward or backward running. In a series HEV running mode, while the starting clutch 26 is put into the interruption state to disconnect the engine 12 from the drive power transmission path, the engine 12 is operated to rotationally drive the first motor generator MG1 and, while the first motor generator MG1 is subjected to electric generation control (also referred to as regeneration control), the second motor generator MG2 is subjected to the power running control for forward or backward running as is the case with the EV running mode. The electric power acquired by the first motor generator MG1 is supplied to the second motor generator MG2 or used for charging the battery 60. The power running control means that a motor generator is used as an electric motor and the electric generation control means that a motor generator is used as an electric generator.

A parallel HEV running mode is a mode in which the starting clutch 26 is connected to connect the engine 12 to the drive power transmission path so that the engine 12, the first motor generator MG1, and the second motor generator MG2 can be used as drive power sources for running, and includes three sub-modes. In a first sub-mode 1 (narrowly-defined parallel HEV running mode), the engine 12 is operated and the first motor generator MG1 is subjected to the power running control so that the engine 12 and the first motor generator MG1 are used as the drive power sources for running while the second motor generator MG2 is freely rotated with zero torque. The second motor generator MG2 may be subjected to the power running control instead of the first motor generator MG1 or both the first motor generator MG1 and the second motor generator MG2 may be subjected to the power running control to generate drive power. In a second sub-mode 2 (series parallel HEV running mode), the engine 12 is operated and the second motor generator MG2 is subjected to the power running control so that the engine 12 and the second motor generator MG2 are used as the drive power sources for running while the first motor generator MG1 is subjected to the electric generation control. The electric power acquired by the first motor generator MG1 is supplied to the second motor generator MG2 or used for charging the battery 60. In the sub-mode 2, the first motor generator MG1 may be subjected to the power running control and used as a drive power source and the second motor generator MG2 may be subjected to the electric generation control. In a third sub-mode 3 (engine running mode), the engine 12 is operated so that only the engine 12 is used as the drive power source for running and both the first motor generator MG1 and the second motor generator MG2 are freely rotated with zero torque.

The sub-mode 1 (narrowly-defined parallel HEV running mode) can generate larger drive power as compared to the sub-mode 3 (engine running mode) and, for example, when the first motor generator MG1 is subjected to the power running control in an assisting manner at the time of an acceleration request due to a rapid increase in the accelerator operation amount θacc or during high speed running, the sub-mode 3 is promptly switched to the sub-mode 1. Although the sub-mode 2 (series parallel HEV running mode) is implemented in the same way as the sub-mode 1, the sub-mode 1 is implemented if the SOC of the battery 60 is relatively larger and the sub-mode 2 is implemented if the SOC is relatively smaller. In these parallel HEV running modes, the forward/backward switching device 22 switches the forward drive state and the backward drive state depending on an operation position of a shift lever not depicted.

During deceleration running with an accelerator turned off while the accelerator operation amount θacc is substantially zero, a deceleration running mode is implemented. In the deceleration running mode, the starting clutch 26 is put into the interruption state to disconnect the engine 12 from the drive power transmission path and the second motor generator MG2 is subjected to the electric generation control so that a rotation resistance due to the electric generation control causes a braking force to act on a vehicle while the battery 60 is charged with generated electric energy. Another running mode may further be provided such that the first motor generator MG1 is subjected to the electric generation control during the engine running (sub-mode 3) to charge the battery 60, for example.

Figure 3:
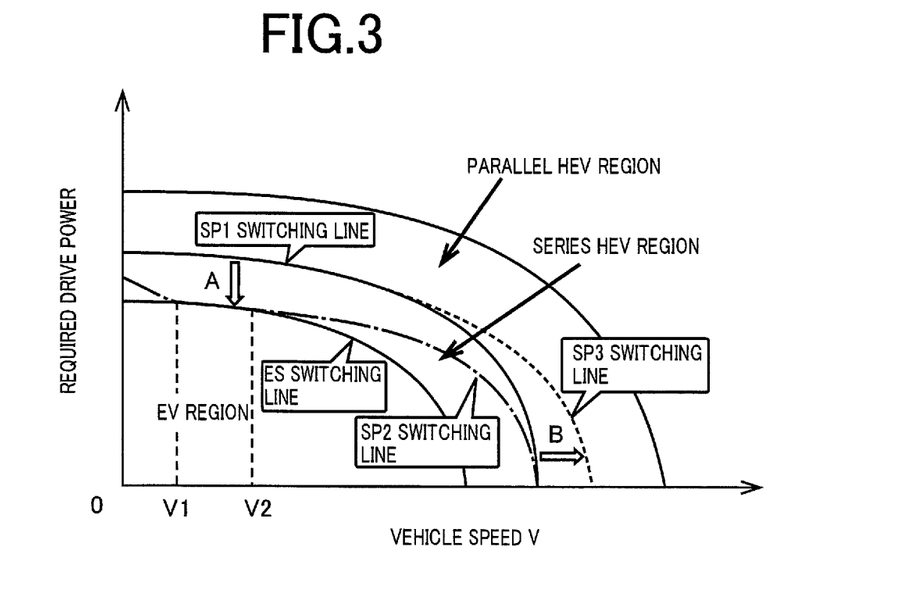
FIG. 3 is a diagram of an example of a mode switching map for switching an EV running mode, a series HEV running mode and a parallel HEV running mode.

Returning to FIG. 1, the running mode switching means 72 switches the plurality of types of the running modes for running in accordance with a mode switching condition set by the mode switching condition setting means 74. The mode switching condition is preset as a two-dimensional mode switching map using the required drive power such as the accelerator operation amount θacc and the vehicle speed V as parameters as depicted in FIG. 3 to define an EV region for running in the EV running mode on the lower required drive force/lower vehicle speed side relative to an ES switching line, a series HEV region for running in the series HEV running mode between SP1 to SP3 switching lines and the ES switching line, and a parallel HEV region for running in the parallel HEV running mode on the higher required drive force/higher vehicle speed side relative to the SP1 to SP3 switching lines. These switching lines are provided with hysteresis for preventing the frequent switching of the running modes due to a slight change in the vehicle speed or required drive power. The mode switching condition setting means 74 changes the SP1 to SP3 switching lines on the boundary between the series HEV region and the parallel HEV region in accordance with driver's intentions and executes a signal process in accordance with a flowchart of FIG. 5.

Figure 5:
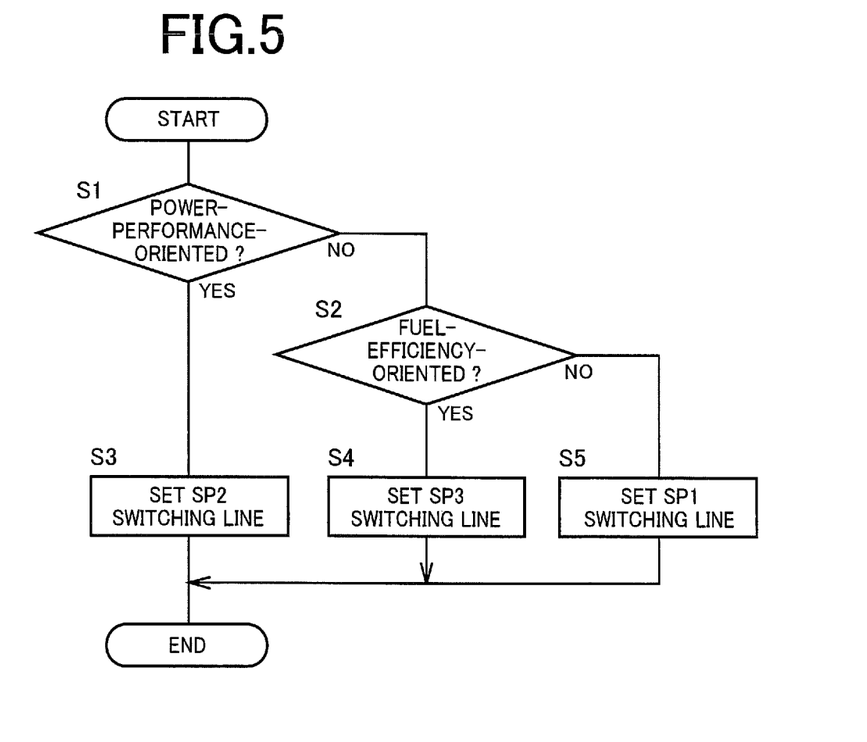
FIG. 5 is a flowchart for specifically explaining an operation of a mode switching condition setting means of FIG. 1.

At step S1 of FIG. 5, it is determined whether a driver's intention is that power-performance-oriented running is desired. Specifically, if the power mode is selected by the mode selection switch 56, it is determined that the power-performance-oriented running is desired. In other cases, if a sequential mode or manual mode is selected that enables the gear ratio γ of the automatic transmission 20 to be switched by manual operation, or if a change rate (increase rate) of the accelerator operation amount θacc is larger, whether the power-performance-oriented running is desired is determined from a driver's driving state. If it is determined that the power-performance-oriented running is desired, step S3 is executed to set the SP2 switching line depicted by a dashed-dotted line in FIG. 3.

If the determination at step S1 is NO (negative), i.e., if the driver's intention is that the power-performance-oriented running is not desired, step S2 is executed to determine whether the driver desires fuel-efficiency-oriented running. Specifically, if the eco-mode is selected by the mode selection switch 56, it is determined that the fuel-efficiency-oriented running is desired. In other cases, whether the fuel-efficiency-oriented running is desired is determined from a driver's driving state such as operation tendencies of the accelerator and brake pedals and acceleration/deceleration of a vehicle speed. If it is determined that the fuel-efficiency-oriented running is desired, step S4 is executed to set the SP3 switching line depicted by a dotted line in FIG. 3. If the determination at step S2 is NO, i.e., if it cannot be determined that either the power-performance-oriented running or the fuel-efficiency-oriented running is desired from the driver's intention, step S5 is executed to set the SP1 switching line of the normal time (normal value) depicted by a solid line in FIG. 3.

The SP2 switching line is set when it is determined that the power-performance-oriented running is desired and has an upper limit of a range of the required drive power for selecting the series HEV running mode made lower than the normal SP1 switching line as indicated by a white arrow A in FIG. 3, narrowing the series HEV region as compared to the case of the SP1 switching line. If the series HEV region is narrowed to the lower required drive force side, the parallel HEV region capable of generating larger drive power is correspondingly expanded and the EV running mode is promptly shifted to the parallel REV running mode, which improves drivability performance at the time of depressing operation of the accelerator pedal.

The SP2 switching line is substantially matched to the ES switching line in an intermediate vehicle speed range V1 to V2 such that the series HEV region partially disappears, making a contact between the EV region and the parallel HV region. In this case, when the EV running mode is shifted to the parallel REV running mode, for example, after the engine 12 is cranked by inertia of output through adjustment of the torque (engagement oil pressure) of the starting clutch 26 and the engine 12 is started by fuel injection and ignition, the starting clutch 26 is completely engaged to promptly make the switch to the parallel HEV running mode. Since the inertia from output capable of cranking the engine 12 cannot be acquired at a vehicle speed lower than a vehicle speed V1, the series REV region is slightly left and when the required drive power increases to the series REV region, the normal engine start control using the first motor generator MG1 to crank the engine 12 is provided to make the shift to the series HEV running mode. If the SP2 switching line is subsequently exceeded, synchronization control is provided by the engine 12 and the first motor generator MG1 such that rotations before and after the starting clutch 26 are made substantially identical to connect the starting clutch 26, making the shift to the parallel HEV running mode. In the region of vehicle speed higher than a vehicle speed V2, as is the case with the region of vehicle speed lower than the vehicle speed V1, the EV running mode is shifted to the series HEV running mode and further shifted to the parallel HEV miming mode in a stepwise manner.

The SP3 switching line is set when it is determined that the fuel-efficiency-oriented running is desired and has an upper limit of a range of the vehicle speed V for selecting the series HEV running mode made higher than the normal SP1 switching line as indicated by a white arrow B in FIG. 3, expanding the series HEV region as compared to the case of the SP1 switching line. If the series HEV region is expanded to the higher vehicle speed side, the parallel HEV region is correspondingly narrowed and fuel efficiency is improved. In particular, although the engine 12 is operated for generating electricity with the first motor generator MG1 in the series HEV running mode, since the starting clutch 26 is disconnected to disconnect the engine 12 from the drive power transmission path, the engine 12 can be operated at the most efficient operational point; however, in the parallel HEV running mode, the starting clutch 26 is connected and the operational point of the engine 12 is limited depending on the vehicle speed V etc., deteriorating fuel efficiency.

As described above, in the vehicle hybrid drive device 10 of this embodiment, a range for selecting the series HEV running mode is changed in accordance with the mode switching condition depending on a driver's intention and, therefore, the drivability performance and the fuel efficiency performance intended by a driver can be acquired.

Specifically, if a driver desires the power-performance-oriented running, since the range for selecting the series HEV running mode is narrowed as compared to the normal time by changing the SP1 switching line of the normal time to the SP2 switching line, the EV running mode is promptly shifted to the parallel HEV running mode, which improves the drivability performance, and the drive power from the engine 12 is promptly acquired after the start of the engine without causing a feeling of strangeness in the driver. Particularly, since the upper limit of the range of the required drive power for selecting the series HEV running mode is made lower as compared to the normal time, the shift to the parallel HEV running mode is made by a correspondingly smaller required drive power, i.e., accelerator operation amount θacc, enabling the acquisition of excellent drivability performance.

If a driver desires the fuel-efficiency-oriented running, since the range for selecting the series HEV running mode is expanded as compared to the normal time by changing the SP1 switching line of the normal time to the SP3 switching line, the time and occasion of running in the series HEV running mode increase and the engine 12 can be operated at the optimum operational point without being affected by the vehicle speed V, which improves fuel efficiency. Particularly, since the upper limit of the range of the vehicle speed V for selecting the series HEV running mode is made higher as compared to the normal time, the region of the parallel HEV running mode with poor fuel efficiency is accordingly narrowed and a more excellent fuel efficiency improvement effect can be acquired.

Other embodiments of the present invention will be described. In the following embodiments, the portions substantially common to the embodiments are denoted by the same reference numerals and will not be described in detail.

Second Embodiment

Figure 6:
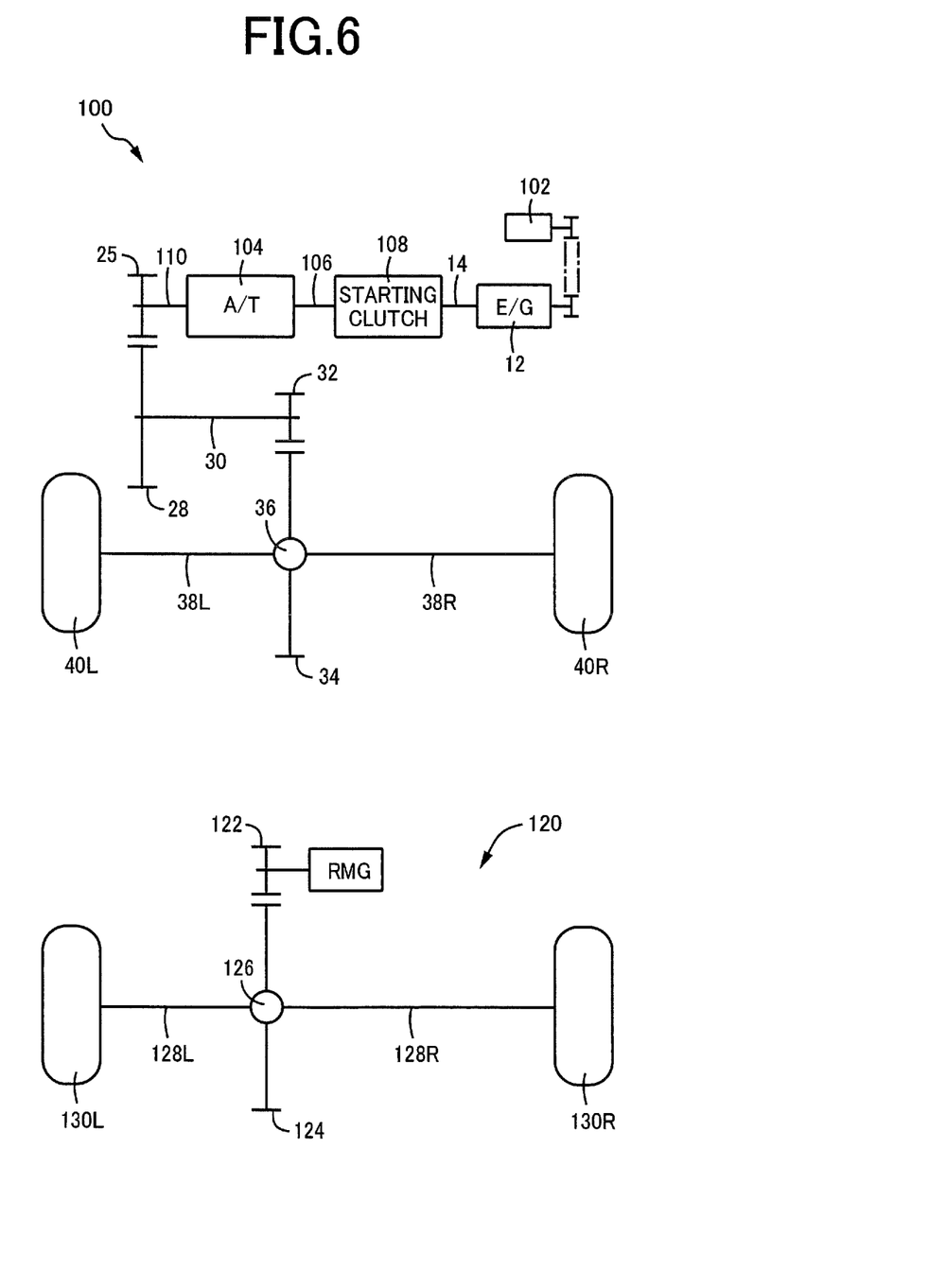
FIG. 6 is a schematic of a configuration of another example of the vehicle hybrid drive device to which the present invention is preferably applied.

FIG. 6 is a schematic of a configuration of another example of the vehicle hybrid drive device to which the present invention is preferably applied. A vehicle hybrid drive device 100 has the engine 12 cranked by a starter motor 102 coupled via a belt etc., to the crankshaft 14 and includes a stepped automatic transmission 104 of a planetary gear type etc., with a plurality of gear stages and neutral established depending on an engagement/release state of a plurality of clutches and brakes, and a starting clutch 108 enabling/interrupting power transmission is disposed between an input shaft 106 of the automatic transmission 104 and the crankshaft 14. The starter motor 102 corresponds to a first rotating machine and is made up of a motor generator also having a function of an electric generator. Although the starting clutch 108 corresponds to the connection/disconnection device in this embodiment, the automatic transmission 104 capable of being neutral can be used as the connection/disconnection device. The first gear 25 is disposed on an output shaft 110 of the automatic transmission 104 to transmit the drive power to the front drive wheels 40L and 40R. The second motor generator MG2 is not included.

On the other hand, the vehicle hybrid drive device 100 includes a rear wheel drive device 120 and a rear motor generator RMG rotationally drives a differential gear device 126 via a fifth gear 122 and a sixth gear 124 to rotationally drive left and right rear drive wheels 130L and 130R via left and right axles 128L and 128R. The rear motor generator RMG corresponds to the second rotating machine.

The vehicle hybrid drive device 100 includes the hybrid control means 70 as is the case with the vehicle hybrid drive device 10 of the embodiment to switch the various running modes depicted in FIG. 4 for running and has the mode switching condition setting means 74 changing the mode switching condition depending on a driver's intention in accordance with the flowchart of FIG. 5. In FIG. 4, the first motor generator MG1, the second motor generator MG2, and the starting clutch 26 are replaced with the starter motor 102, the rear motor generator RMG, and the starting clutch 108, respectively. Substantially the same effect as the first embodiment is acquired in this embodiment.

In the engine running mode (the sub-mode 3 of the parallel HEV running mode), the rear drive wheels 130L and 130R can rotationally be driven by the rear motor generator RMG as needed for running in the four-wheel drive state. Reduction gears and a connection/disconnection device such as a clutch may be disposed as needed between the rear motor generator RMG and the fifth gear 122. A drive device acquired by removing the second motor generator MG2 from the first embodiment can directly be employed as a drive device for driving front wheels.

Third Embodiment

Figure 7A:
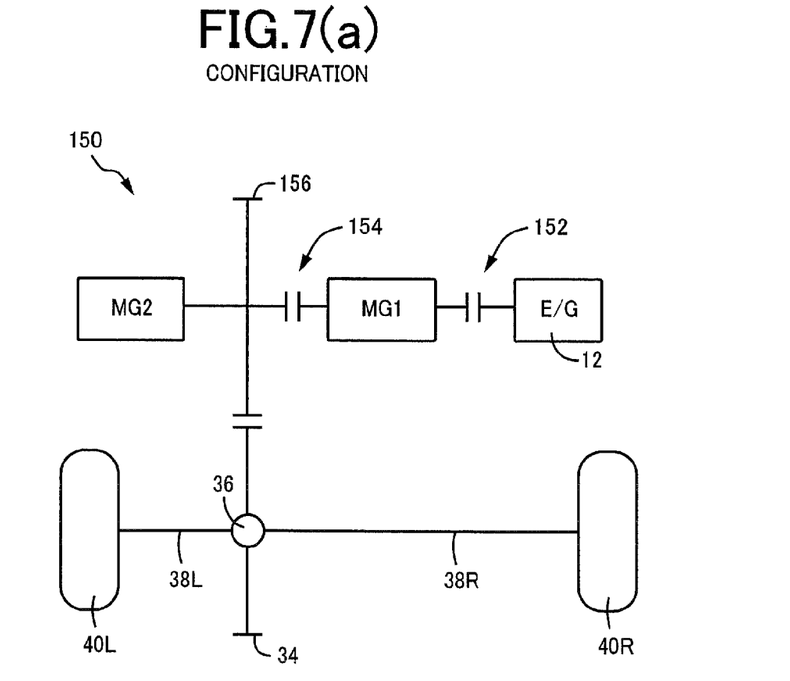
Figure 7B:
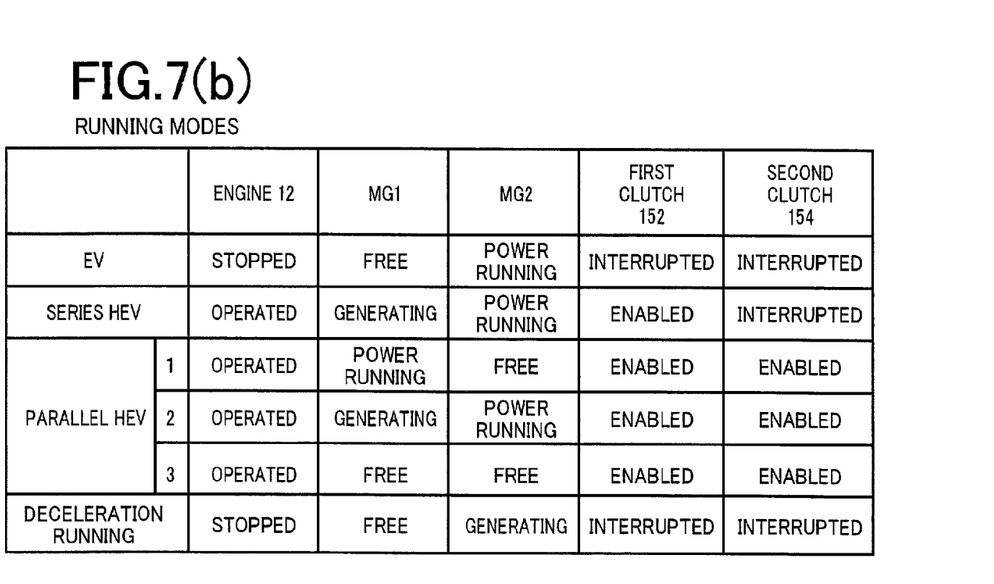

FIG. 7 is a diagram for explaining yet another example of the vehicle hybrid drive device to which the present invention is preferably applied and (a) is a schematic of a configuration while (b) is a diagram for explaining various running modes. This vehicle hybrid drive device 150 has the engine 12, a first clutch 152, the first motor generator MG1, a second clutch 154, and the second motor generator MG2 coupled in series on a common axis line and an output gear 156 disposed between the second clutch 154 and the second motor generator MG2 is engaged with the fourth gear 34. As depicted in (b) of FIG. 7, the vehicle hybrid drive device 150 enables the EV running mode, the series HEV running mode, the parallel HEV running mode having three sub-modes, and the deceleration running mode as is the case with the first embodiment, uses the hybrid control means 70 to switch those running modes for running, and uses the mode switching condition setting means 74 to change the mode switching condition depending on a driver's intention in accordance with the flowchart of FIG. 5. Substantially the same effect as the first embodiment is acquired in this embodiment.

Since the vehicle cannot go backward in the engine running mode (the sub-mode 3 of the parallel HEV running mode) in this embodiment, backward running is performed in the EV running mode or the series HEV running mode. The second clutch 154 acts as the connection/disconnection device which disconnects the engine 12 from the drive power transmission path in the EV running mode and the series HEV running mode.

Fourth Embodiment

Figure 8A:
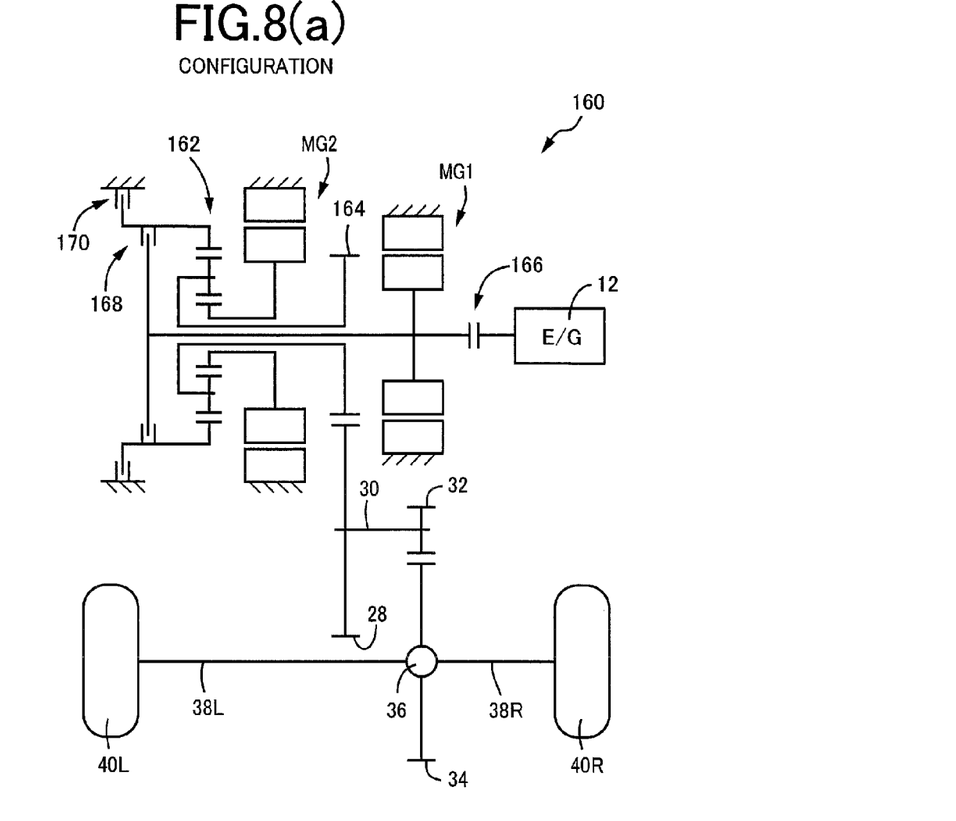
Figure 8B:
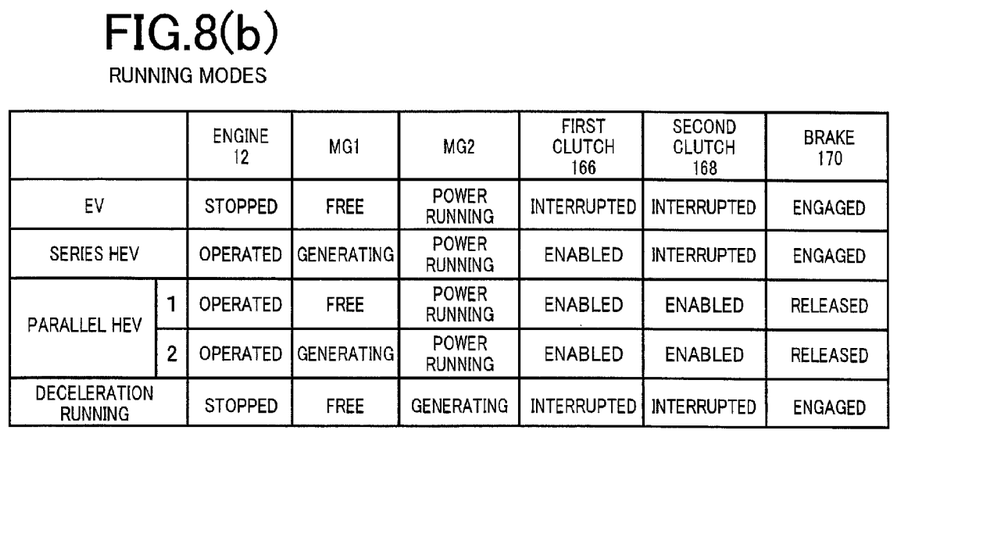

FIG. 8 is a diagram for explaining a further example of the vehicle hybrid drive device to which the present invention is preferably applied and (a) is a schematic of a configuration while (b) is a diagram for explaining various running modes. This vehicle hybrid drive device 160 has the engine 12, the first motor generator MG1, the second motor generator MG2, and an output gear 164 connected via a planetary gear device 162 and has a first clutch 166 disposed between the engine 12 and the first motor generator MG1 while the first motor generator MG1 is coupled via a second clutch 168 to a ring gear of the planetary gear device 162. The ring gear is non-rotatably fixed by a brake 170. The planetary gear device 162 has a sun gear coupled to the second motor generator MG2 and a carrier coupled to the output gear 164 while the output gear 164 is engaged with the second gear 28.

As depicted in (b) of FIG. 8, the vehicle hybrid drive device 160 enables the EV running mode, the series HEV running mode, the parallel HEV running mode, and the deceleration running mode as is the case with the first embodiment, uses the hybrid control means 70 to switch those running modes for running, and uses the mode switching condition setting means 74 to change the mode switching condition depending on a driver's intention in accordance with the flowchart of FIG. 5. Substantially the same effect as the first embodiment is acquired in this embodiment.

In FIG. 8(b), the brake 170 is fixed and the second motor generator MG2 is subjected to the power running control for running in the EV running mode; however, the brake 170 can be released with the second clutch 168 connected so that both the first motor generator MG1 and the second motor generator MG2 can be subjected to the power running control for running. The parallel HEV running mode enables two sub-modes, and a sub-mode 1 in the upper row is the narrowly-defined parallel HEV running mode in which both the engine 12 and the second motor generator MG2 are used as the drive power source for running. A sub-mode 2 in the lower row is the series parallel HEV running mode in which the first motor generator MG1 is subjected to the electric generation control in the sub-mode 1. The backward running may be performed in the EV running mode or the series HEV running mode. The second clutch 168 acts as the connection/disconnection device which disconnects the engine 12 from the drive power transmission path in the EV running mode and the series HEV running mode.

Although the embodiments of the present invention have been described in detail with reference to the drawings, these are merely exemplary embodiments and the present invention may be implemented in variously modified and improved forms based on the knowledge of those skilled in the art.

Nomenclature Of Elements

10, 100, 150, 160: vehicle hybrid drive device 12: engine 50: electronic control device 74: mode switching condition setting means 102: starter motor (first rotating machine) MG1: first motor generator (first rotating machine) MG2:

second motor generator (second rotating machine) RMG: rear motor generator (second rotating machine)

The invention claimed is:

1. A vehicle hybrid drive device having:
an EV running mode enabling a vehicle to run only with a second rotating machine used as a drive power source while an engine is disconnected from a drive power transmission path,
a series HEV running mode enabling the vehicle to run only with the second rotating machine used as the drive power source while a first rotating machine is rotationally driven to generate electricity by the engine disconnected from the drive power transmission path, and a parallel HEV running mode enabling the vehicle to run with the engine and at least one of the first and second rotating machines used as the drive power sources while the engine is connected to the drive power transmission path, the running modes being selected in accordance with a mode switching condition defined based on at least one of a required drive power and a vehicle speed, wherein:
the mode switching condition is set such that the series HEV running mode and the parallel HEV running mode are selected after the EV running mode as the vehicle speed increases, and
a range for selecting the series HEV running mode in accordance with the mode switching condition being changed depending on a driver's intention, if a driver desires fuel-efficiency-oriented running, the range for selecting the series HEV running mode is wider than when in a normal mode, and an upper limit of a range of the vehicle speed for selecting the series HEV running mode is made higher than when in the normal mode.

2. The vehicle hybrid drive device of claim 1, wherein
if a driver desires power-performance-oriented running, the range for selecting the series HEV running mode is made narrower than when in the normal mode.

3. The vehicle hybrid drive device of claim 2, wherein
the mode switching condition is defined based at least on the required drive power and set such that the series HEV running mode and the parallel HEV running mode are selected after the EV running mode as the required drive power increases, and wherein
if a driver desires the power-performance-oriented running, an upper limit of a range of the required drive power for selecting the series HEV running mode is made lower than when in the normal mode.

* * * * *